United States Patent Office 2,752,379
Patented June 26, 1956

2,752,379

RESOLVING CHLOROSILANE MIXTURES

George H. Wagner, Clarence, and William G. Whitehead, Jr., Kenmore, N. Y., assignors to Union Carbide and Carbon Corporation, a corporation of New York No Drawing. Application October 29, 1952,
Serial No. 317,592

5 Claims. (Cl. 260—448.2)

The invention is concerned with the resolving of mixtures of chlorosilanes, and more particularly it relates to a method for separating tetrachlorosilane, or other chlorosilanes, from mixtures thereof with organochlorosilanes, such as trimethylchlorosilane.

A common way of preparing methyl silicon chlorides consists in the reaction of methyl chloride with silicon, usually in the presence of a copper catalyst. The product of this reaction is mainly a mixture of methyl chlorosilanes and tetrachlorosilane. A clean separation of all components of this mixture is practically impossible by ordinary fractional distillation, as trimethyl chlorosilane and tetrachlorosilane have approximately the same boiling point (about 57.5° C.). These compounds also form a constant boiling, or azeotropic, mixture, which contains the two chlorosilanes in approximately equimolecular proportions, and which distills at about 54.5° C. under normal pressures. Since the trimethyl derivative, free from associated silicon tetrachloride, has especial value and use commercially, particularly in the making of certain silicone polymer compositions, it is very desirable to be able to recover the trimethyl chlorosilane in pure and unadulterated form.

While various means of accomplishing this end have, heretofore, been proposed, which in general have followed known methods of resolving other azeotropic mixtures, these have not been too satisfactory in commercial application. It is, therefore, the object of this invention to provide an improved method of resolving azeotropic mixtures of trimethyl chlorosilane and silicon tetrachloride, and further to provide a means of effecting a more ready and clean separation of silicon tetrachloride and other chlorosilanes from mixtures thereof with organo-chlorosilanes.

The invention is based upon the finding that certain tertiary amines will react with chlorosilanes, in particular silicon tetrachloride, to form solid reaction products, whereas these same amines will not combine with trimethyl chlorosilane or the other organochlorosilanes. Thus an azeotropic mixture of $SiCl_4$ and $(CH_3)_3SiCl$ can be broken down by precipitation of the $SiCl_4$, and the organochlorosilane can then readily be recovered by ordinary distillation. The solid formed in this reaction appears to be a straight addition product of the silicon tetrachloride, which can be represented by the type formula $SiCl_4:2$ amine. There are many of these tertiary amines which may be suitable for the purpose intended, and those which have been tested and found to form solid addition products with $SiCl_4$, or other chlorosilanes, include trimethylamine, triethylamine, and certain cyclic unsaturated amines, such as pyridine, 3-methyl pyridine, 4-(5-nonyl-pyridine, dipyridyl, phenazine and quinoline.

The following experiment will more specifically illustrate the method proposed by this invention.

An azeotropic mixture of $(CH_3)_3SiCl$ and $SiCl_4$ was made up, and 150 grams of this mixture was treated with 2.6 moles of pyridine. The mixture was kept cool, at a temperature of about 0° C., until all of the $SiCl_4$ (0.57 mole) had reacted. The mobile slurry, containing precipitated $SiCl_4 \cdot 2C_5H_5N$, was then distilled until the distillate was equivalent to 87% of the initial weight of $(CH_3)_3SiCl$. All of the distilled portion had a density of 0.86, which is identical with the reported values for $(CH_3)_3SiCl$, and a chlorine analysis of a distilled fraction showed 33.2% Cl, compared with the calculated amount in trimethyl chlorosilane of 32.7%. Thus the recovered $(CH_3)_3SiCl$ showed no evidence of appreciable contamination with $SiCl_4$.

In resolving the product obtained from the reaction of methyl chloride with silicon, the tertiary amines as described will also provide a more ready separation between other organo-silanes and the halo-silanes. For example, a mixture of 0.283 mole of $CH_3SiCl_3$ with 0.079 mole of $SiCl_4$ was treated with 0.786 mole of pyridine. The methyl trichlorosilane was recovered by distillation at 66° C. and the silicon tetrachloride, which boils at 58° C., did not come over, showing that it had been held back by reaction with the added pyridine. The precipitated amine complex can be broken, subsequent to the separation, by treating it with anhydrous HCl.

Other examples of the application of the method of this invention are shown in the following table.

| To Separate— | From— | Use— | Forming Addition Compound |
| --- | --- | --- | --- |
| $SiCl_4$ | Organo-silanes | Pyridine | $SiCl_4 \cdot 2$ pyridine. |
| | | 3-Methyl Pyridine | $SiCl_4 \cdot 2$ (3-Methyl Pyridine). |
| | | 4-Methyl Pyridine | $SiCl_4 \cdot 2$ (4-Methyl Pyridine). |
| $SiHCl_3$ | do | Pyridine | $SiHCl_3 \cdot 2$ pyridine. |
| | | 3-Methyl Pyridine | $SiHCl_3 \cdot 2$ (3-Methyl Pyridine). |
| | | 4-Methyl Pyridine | $SiHCl_3 \cdot 2$ (4-Methyl Pyridine). |
| | | $R_3N^*$ | $2SiHCl_3 \cdot 3R_3N$. |
| $SiH_2Cl_2$ | do | Pyridine | $SiH_2Cl_2 \cdot 2$ pyridine. |
| | | 3-Methyl Pyridine | $SiH_2Cl_2 \cdot 2$ (3-Methyl Pyridine). |
| | | 4-Methyl Pyridine | $SiH_2Cl_2 \cdot 2$ (4-Methyl Pyridine). |
| | | $R_3N^*$ | $2SiH_2Cl_2 \cdot 3R_3N$. |
| $Si_2Cl_6$ | do | Pyridine | $Si_2Cl_6 \cdot 3$ pyridine. |
| | | 3-Methyl Pyridine | $Si_2Cl_6 \cdot 3$ (3-Methyl Pyridine). |
| | | 4-Methyl Pyridine | $Si_2Cl_6 \cdot 3$ (4-Methyl Pyridine). |

*$R = CH_3$ or $C_2H_5$.

We claim:

1. The method of separating inorganic chlorosilanes taken from the group consisting of silicon chlorides and hydrogen silicon chlorides from mixtures thereof with alkylchlorosilanes, which comprises converting the inorganic chlorosilanes to solid reaction products by addition to said mixtures of a tertiary unsaturated-N-heterocyclic amine and distilling off the alkylchlorosilanes.

2. The method of separating inorganic chlorosilanes taken from the group consisting of silicon chlorides and hydrogen silicon chlorides from mixtures thereof with alkylchlorosilanes, which comprises converting the inorganic chlorosilanes to solid reaction products by addition to said mixtures of an unsaturated heterocyclic amine taken from the group consisting of pyridine, 3-methyl pyridine, 4-methyl pyridine, 4-(5-nonyl) pyridine, dipyridyl, phenazine and quinoline and distilling off the alkylchlorosilanes.

3. The method of separating inorganic chlorosilanes taken from the group consisting of silicon chlorides and hydrogen silicon chlorides from mixtures thereof with methylchlorosilanes, which comprises converting the inorganic chlorosilanes to solid reaction products by addition to said mixtures of an unsaturated heterocyclic amine taken from the group consisting of pyridine, 3-methyl pyridine, 4-methyl pyridine, 4-(5-nonyl)pyridine, dipyridyl, phenazine and quinoline and distilling off the methylchlorosilanes.

4. Method of resolving an azeotropic mixture of trimethylchlorosilane and silicon tetrachloride, which comprises converting the silicon tetrachloride to a solid reaction product, by addition to said mixture of a cyclic, unsaturated, tertiary amine of the group consisting of pyridine, 3 and 4-methyl pyridine, 4-(5-nonyl)pyridine, dipyridyl, phenazine and quinoline and separating the trimethylchlorosilane by distillation.

5. Method of resolving an azeotropic mixture of trimethylchlorosilane and silicon tetrachloride, which comprises converting the silicon tetrachloride to a solid reaction product, by addition of pyridine to said mixture, and separating the trimethylchlorosilane by distillation.

References Cited in the file of this patent

UNITED STATES PATENTS

| | | |
|---|---|---|
| 2,381,139 | Sauer | Aug. 7, 1945 |
| 2,388,575 | Sauer et al. | Nov. 6, 1945 |
| 2,449,815 | Newkirk | Sept. 21, 1948 |
| 2,485,366 | Di Giorgio et al. | Oct. 18, 1949 |
| 2,519,926 | Patnode et al. | Aug. 22, 1950 |
| 2,567,724 | Moody | Sept. 11, 1951 |
| 2,580,473 | Sowa | Jan. 1, 1952 |

FOREIGN PATENTS

| | | |
|---|---|---|
| 612,646 | Great Britain | Nov. 16, 1948 |

OTHER REFERENCES

Emeleus: "Nature," vol. 42 (1938), pages 996, 997.
Trost: "Canadian Journal of Chemistry," vol. 29 (1951), pages 1075–78.